United States Patent [19]
Davis

[11] 4,380,970
[45] Apr. 26, 1983

[54] COMBUSTION ENGINES

[76] Inventor: Roy A. Davis, 43 Glendower St., Perth, Australia, 6000

[21] Appl. No.: 248,499

[22] Filed: Mar. 27, 1981

Related U.S. Application Data

[63] Continuation-in-part of Ser. No. 75,003, Sep. 12, 1979, abandoned.

[30] Foreign Application Priority Data

Aug. 1, 1979 [AU] Australia .................. PD9818

[51] Int. Cl.³ .............. F02B 43/08; F02D 19/00; F02M 25/00
[52] U.S. Cl. .................. 123/3; 123/25 B; 123/DIG. 12; 123/1 A; 123/25 R
[58] Field of Search .......... 123/DIG. 12, 25 B, 25 D, 123/25 P, 3, 1 A, 25 R

[56] References Cited

U.S. PATENT DOCUMENTS 4,030,453 6/1977 Schreiber ............ 123/DIG. 12
4,037,568 7/1977 Sugimoto ............ 123/25 B

FOREIGN PATENT DOCUMENTS 52-21528 2/1977 Japan ............ 123/DIG. 12

*Primary Examiner*—Wendell E. Burns
*Attorney, Agent, or Firm*—Dennison, Meserole, Pollack & Scheiner

[57] ABSTRACT

The invention provides an alternative fuel for internal combustion engines in which the exhaust heat is used to thermally dissociate water to its constituent gases hydrogen and oxygen. The hydrogen and oxygen so produced is introduced into the combustion chamber of the engine to at least partially replace the conventional fuel. In a preferred embodiment of the invention, water is dissociated into hydrogen and oxygen in a dissociation chamber in the form of a transition tube containing a spirally wound ribbon arranged to urge water in the transition tube outwardly into contact with walls of the transition tube, said walls being heated by exhaust gases of an internal combustion engine.

10 Claims, 7 Drawing Figures

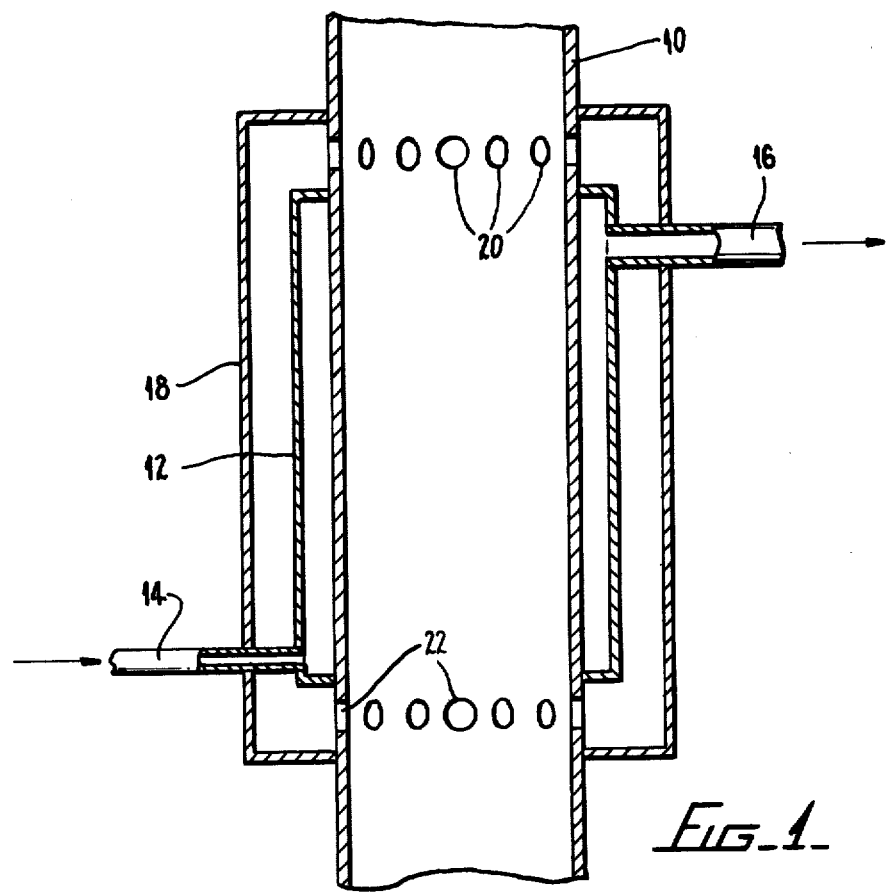
Fig_1_
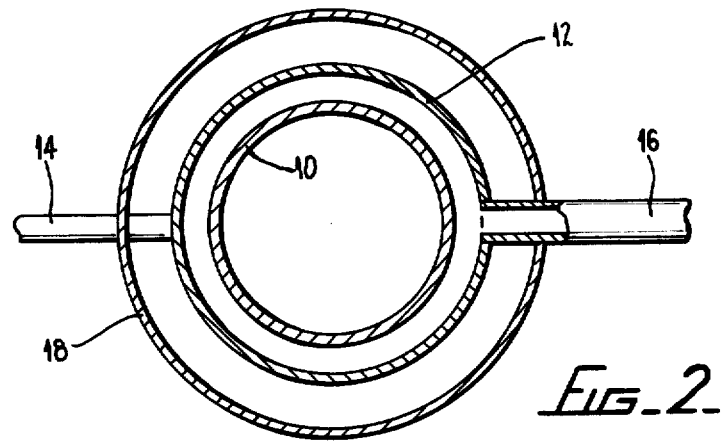
Fig_2_

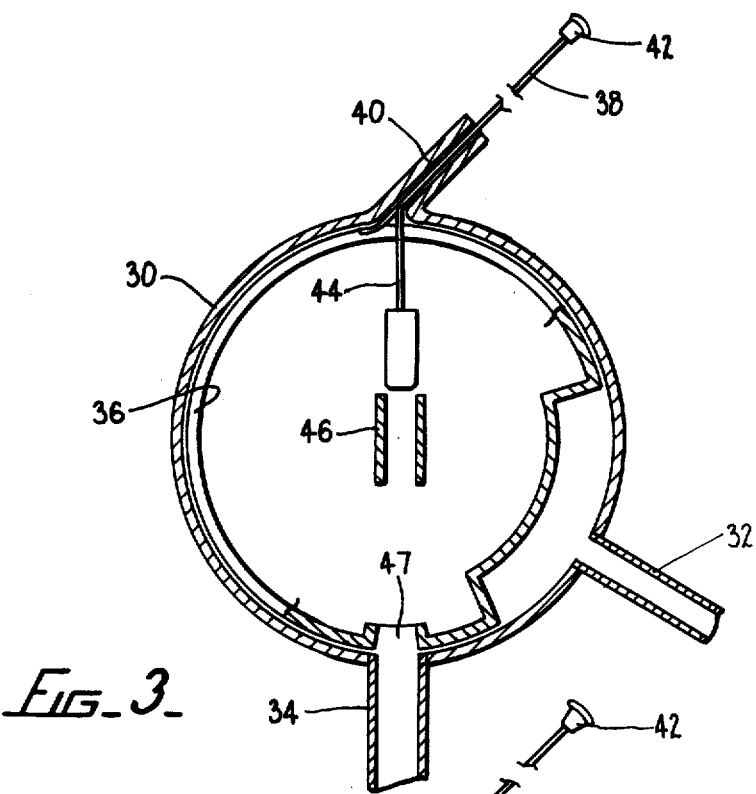
_Fig_3_
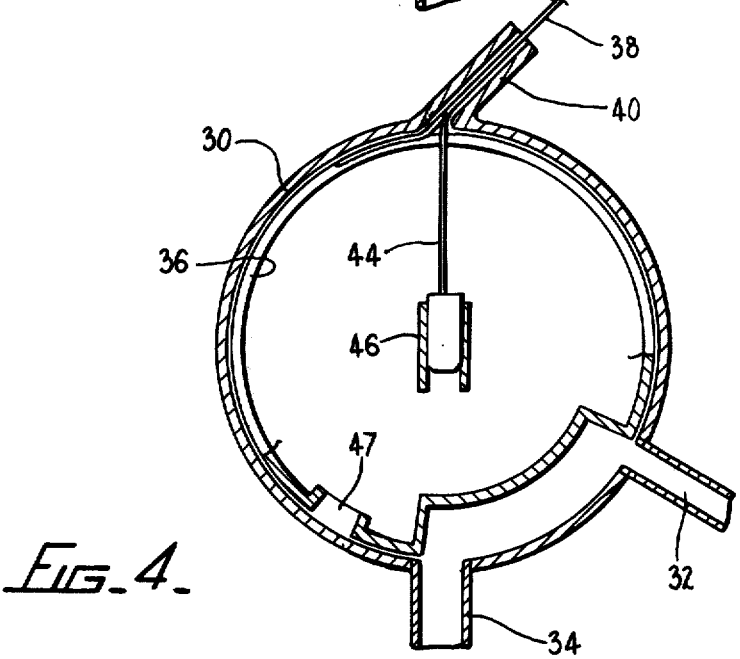
_Fig_4_

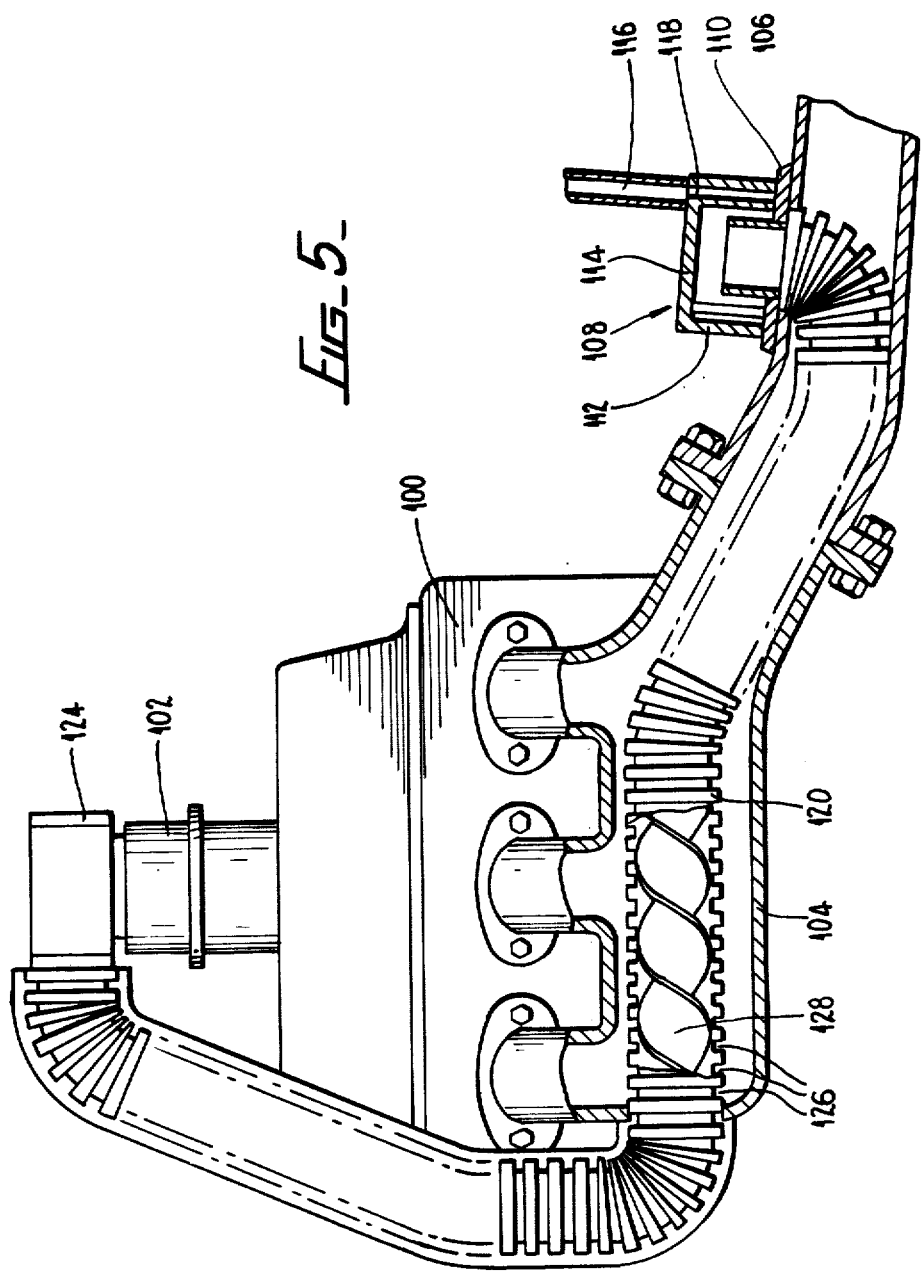

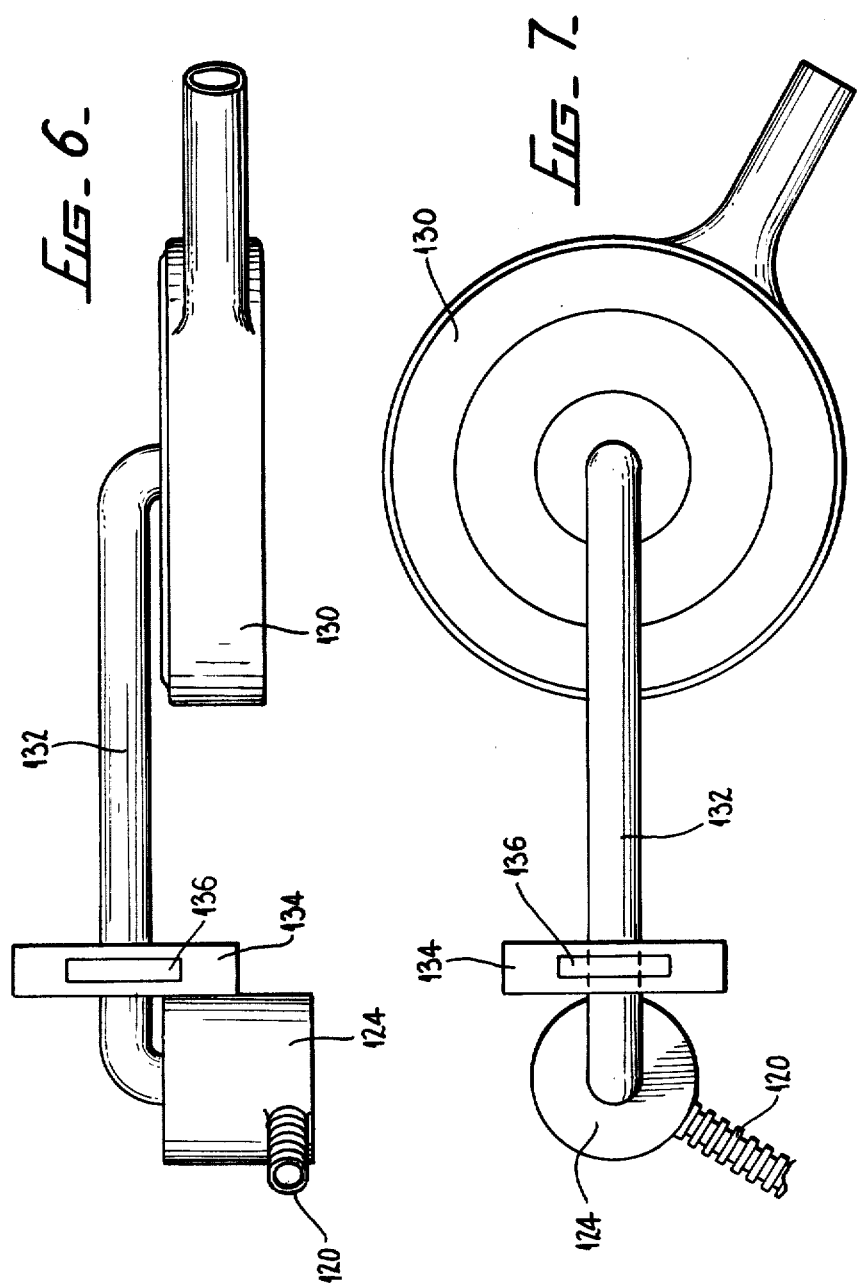

COMBUSTION ENGINES

This application is a continuation-in-part of now abandoned application No. 75,003 filed Sept. 12, 1979 in the name of ROY A. DAVIS.

The present invention relates to internal combustion engines. Internal combustion engines including four stroke and two stroke piston engines, rotary engines, diesel engines, jet engines and gas turbines are for the most part fuelled by liquid fuels obtained from petroleum. In recent years there has been increasing concern that the available reserves of petroleum are limited. With present consumption rates the world could face mounting difficulties in meeting the demand for liquid fuels in the years to come. There have been many proposals for alternative fuels but so far no fully satisfactory alternative to liquid petroleum based products has been found.

It has now been discovered that an internal combustion engine can be fuelled at least in part by an alternative fuel which utilizes the waste heat of the exhaust gases of the internal combustion engine.

In accordance with the present invention there is provided a method of operating an internal combustion engine comprising inlet means, a combustion chamber and exhaust means, which method comprises introducing a combustible gaseous composition into the combustion chamber through the inlet means thereof, combusting the combustible composition in the combustion chamber to provide a driving force for the engine, and exhausting the combusted composition from the combustion chamber through the exhaust means, wherein the combusted material is caused to heat water to a temperature sufficient to thermally dissociate the water into its constituent gases hydrogen and oxygen, and hydrogen and oxygen so produced is introduced into the combustion chamber to form at least part of said combustible composition.

In accordance with the present invention there is also provided an internal combustion engine comprising inlet means, a combustion chamber and exhaust means, a dissociation chamber in heat communication with the exhaust means, inlet means for the dissociation chamber and outlet means for the dissociation chamber, means for introducing water to the dissociation chamber through the inlet means thereof, and means for introducing gases into the inlet means of the combustion chamber from the dissociation chamber through the outlet means thereof, whereby, in use, water is thermally dissociated in the dissociation chamber into its constituent gases, hydrogen and oxygen, and the hydrogen and oxygen so produced is introduced into the combustion chamber through the inlet means thereof.

The present invention will now be described, by way of example, with reference to the accompanying drawings, in which:

FIG. 1 is a schematic vertical sectional view through an exhaust means of an internal combustion engine provided with a chamber in accordance with the present invention;

FIG. 2 is a horizontal sectional view through the apparatus of FIG. 1;

FIG. 3 is a horizontal sectional view of a control mechanism for the apparatus of FIGS. 1 and 2, in a first position;

FIG. 4 is a view similar to FIG. 3 showing the control mechanism in a second position;

FIG. 5 is a schematic side elevation of an internal combustion engine provided with a modified and improved chamber in accordance with the present invention;

FIG. 6 is a schematic side elevation of an air induction system for a carburettor which system is provided with a sound projector; and FIG. 7 is a plan view of the system of FIG. 6.

In FIGS. 1 and 2, there is shown an exhaust pipe 10 of a four stroke internal combustion engine of a typical road vehicle. An annular chamber 12 is mounted about the exhaust pipe 12. The chamber 12 comprises inlet means 14 and an outlet means 16.

A container 18 is mounted to the exhaust pipe 10 and surrounds the chamber 12. The container 18 is in fluid communication with the exhaust pipe 10 through holes 20 and 22. Typically, the chamber 12 and container 18 are welded to the exhaust pipe 10.

In use, while the engine is in operation, exhaust gases pass through the exhaust pipe 10 and cause the wall thereof to become heated. A minor proportion of exhaust gases also pass through the holes 20 into the container 18. These exhaust gases heat the walls of the container 18 while passing therethrough and return to the exhaust pipe 10 through the holes 22. Thus, the walls of the chamber 12, that is the common walls with the exhaust pipe 10 and container 18 become heated. Water is introduced into the chamber 12 through the inlet means 14. The water so introduced is heated by the walls of the chamber 12 and thermally dissociated into its constituent gases hydrogen and oxygen. The outlet means 16 is in communication with the choke of a conventional carburettor.

In conventional manner a piston reciprocates within a cylinder of the four stroke engine. On every other down stroke of the piston an inlet valve is opened to admit air and fuel mixture from the carburettor into the cylinder. Normally, the fuel is petrol which is supplied in liquid form to the carburettor. Petrol vapour is induced into the air stream flowing through the choke of the carburettor. The petrol enters the air stream from a pilot jet and a main jet. The pilot jet is used when the engine is idling and the main jet is used to supply fuel when the vehicle is in motion.

With the apparatus of the present invention the main jet can be closed off so that no petrol enters the air stream through the main jet. Thus, when the inlet valve of the engine is open and the piston is travelling downwardly the hydrogen and oxygen produced in the chamber 12 is induced into the air stream to provide fuel necessary to operate the engine in place of the petrol which is normally induced through the main jet. A small amount of petrol still enters the combustion chamber through the pilot jet.

When the engine is cold the walls of the chamber 12 are also cold and thus no hydrogen and oxygen can be produced. Thus, in a conventional engine with a conventional carburettor, the engine may initially be operated in the normal manner using petrol from the main jet to propel the vehicle.

However, as the exhaust pipe 10 and container 18 are heated by exhaust gases production of hydrogen and oxygen commences. When the rate of gas production has reached a satisfactory level the main jet can be closed so that the engine is operating largely on the hydrogen and oxygen produced by dissociation of water.

A suitable control mechanism for switching from total petrol fuel to mainly hydrogen and oxygen fuel is shown in FIGS. 3 and 4. The control mechanism shown in FIGS. 3 and 4 comprises an outer cylinder 30 which is arranged to be mounted on top of a carburettor between the carburettor and a conventional air filter. The outer cylinder 30 is in fluid communication with the outlet means 16 of the chamber 12. The outer cylinder 30 contains a signal port 32 and a carburettor port 34 through which hydrogen and oxygen enters the carburettor. A ported cylinder 36 is snugly fitted within the outer cylinder 30. The ported cylinder 36 is mounted for partial rotation. The partial rotation of the ported cylinder 36 is achieved by means of a cable 38 having one end attached to the ported cylinder 36. The cable 38 passes through an aperture in the outer cylinder 30 and along a conduit 40. The conduit 40 terminates at an appropriate location such as the dashboard of the vehicle. The free end of the cable 38 is provided with a knob 42.

A further cable 42 is mounted to the cable 38. The further cable 44 terminates adjacent the entrance to a main jet 46 in the position shown in FIG. 3.

In operation, the ported cylinder 36 is initially located in the position shown in FIG. 3. In this position the gas initially produced by dissociation of water as the chamber 12 is heated is directed from the carburettor port 36 through the signal port 32. The signal port 32 is in communication with an alarm means such as an audible or visual alarm. As the rate of gas production increases it gradually becomes sufficient to replace the petrol introduced into the carburettor through the main jet 46. The alarm means is arranged to be activated at this point.

Upon activation of the alarm means the cable 38 may be pushed using the knob 42, so as to partially rotate the cylinder 36 from the position shown in FIG. 3 to that shown in FIG. 4. In this position the cable 44 enters the main jet 46 and blocks it to prevent petrol entering the carburettor through the main jet 46. Also, the signal port 32 is blocked and the hydrogen and oxygen mixture passes through the carburettor port 34 to enter the carburettor through port 47. Reverse movement of the cable 38 opens the main jet 46 and signal port 32 and closes the carburettor port 34. With the system of the present invention the rate of production of hydrogen and oxygen raises with the temperature of the exhaust gases and the amount of heat transferred to the walls of the chamber 12. Thus, when the engine is working hard the gases are hotter and of greater volume. The amount of heat transferred to the chamber 12 therefore increases and so does the rate of gas production.

Further, the outlet port 16 is in communication with the carburettor choke and thus the pressure inside the chamber 12 is below atmospheric pressure. Under reduced pressure the temperature required to be reached for dissociation of water to take place is lower than that required at atmospheric pressure. Thus, gas production proceeds more readily in the chamber 12 than it would at atmospheric pressure. Further, when the engine is working hard the degree of induction in the carburettor choke is increased and the pressure inside the chamber 12 is further lowered. Thus, gas production is achieved at yet lower temperatures. It is advantageous to produce gas at lower temperatures since the gas has greater density and therefore for a given volume more gas can be introduced to the combustion chamber.

It follows that with the system of the present invention gas is produced only as required and in amounts which correspond with the demands of the engine.

The water may be supplied to the inlet port 14 from a supply tank which may be made of non ferrous metal and have a filler hole and cap with a vent on top. Conveniently, water is supplied to the outlet port 14 by means of gravity through a conduit from the supply tank. The supply tank and conduit may be provided with a flow metering means such as a flow control tap or needle valve with a maximum flow stop. The rate of flow may be metered to a rate of the order of twenty drops of water per minute and generally this supplies sufficient water for operation of a car engine. However, it is found that when the engine is working hard and pressure in the chamber 12 is low more water than normal can be induced through the flow metering means thus ensuring that sufficient water is available for the increased demands of the engine. The chamber 12 is preferably fitted to the hottest part of the exhaust pipe 10 to ensure maximum heat input. Further the assembly of chamber 12 and container 18 with the adjacent portions of the exhaust pipe 10 is preferably thermally insulated to provide for efficient heat transfer to the walls of the chamber 12. The assembly is also preferably constructed of corrosion resistant material such as stainless steel. The initial operation of the engine may be achieved by alternative means to that described above. For example, an electrical heating element could be located in the walls of the chamber 12 to initially heat the walls to a temperature sufficient for gas production to commence. The only disadvantage of this system is that there would be a delay from energising the electrical element until the vehicle could be driven. Further, the invention has been particularly described in relation to an engine provided with a conventional carburettor with idle jet.

Still further, the invention can be applied to all types of internal combustion engines such as four stroke and two stroke engines, diesel engines, rotary engines, jet engines, and gas turbines. All that is required is that means be provided for transferring heat from the exhaust means of the engine to water to cause thermal dissociation of the water into hydrogen and oxygen. The hydrogen and oxygen mixture so produced is introduced into a combustion chamber of the internal combustion engine in a manner analogous to that described above.

Modifications and variations such as would be apparent to a skilled addressee are deemed within the scope of the present invention. For example, when it is required to run solely on hydrogen and oxygen, the conventional fuel can be turned off at source. In a conventional carburettor this can be achieved in the following manner. A cable can be passed through a hole in the top of the float chamber of the carburettor to engage the float valve lever. The cable may be curved within the float chamber so as to present a cam action when actuated. The cable passes along a conduit and terminates at the dashboard of the vehicle in a knob. When the knob is depressed the curved portion of the cable exerts pressure on the float valve lever and thereby holds closed the petrol valve.

In FIG. 5 of the accompanying drawings, there is shown a modified and improved embodiment of the present invention. In the embodiment of FIG. 5 there is shown schematically an internal combustion engine 100 having a carburettor 102 on the inlet side thereof and an exhaust manifold 104 on the outlet side thereof. The exhaust manifold 104 is connected to an exhaust pipe 106.

A housing 108 is mounted on the exhaust pipe 106. The housing 108 comprises a base 110 mounted directly on the exhaust pipe 106. The base 110 contains an aperture which corresponds in size, shape and location with an aperture in the exhaust pipe 106. The housing 108 further comprises a wall 112 upstanding from the base 108 and a roof 114.

A pipe 116 is mounted to the top of the roof 114. Further, the roof 114 contains a small orifice 118 leading from the adjacent end of the pipe 116 to the interior of the housing 108.

A dissociation chamber is in the form of a transition tube 120 which has one end projecting through the mating apertures in the exhaust pipe 106 and the base 110 to form a transition tube inlet.

The transition tube 120 leads from the said one end through the exhaust pipe 106 and the exhaust manifold 104. The transition tube 120 then passes through a wall of the exhaust manifold 104 and leads to a transition tube outlet at an adaptor 124 arranged to be connected in the air intake of the carburettor 102.

The transition tube 120 is internally and externally transversely ribbed as shown in the drawing. This forms internally of the transition tube 120 a number of transverse cells 126. Further, throughout its length from the transition tube inlet to the transition tube outlet the transition tube 120 contains a spirally wound ribbon 128. Preferably, as shown in FIG. 5 the ribbon 128 is a snug fit inside the transition tube 120 so as to contact the inner walls of the transition tube 120 between the cells 126.

In use, and as described above, the engine 100 may be operated in conventional manner using a hydrocarbon fuel and air mixture. Hot exhaust gases are expelled through the exhaust manifold 104 and exhaust pipe 106. The hot exhaust gases cause the exhaust manifold 104, exhaust pipe 106 and the transition tube 120 to become heated.

Water is then admitted through the pipe 116 and the orifice 118 into the chamber 108. In the arrangement shown, the water falls under the influence of gravity onto the base 110. The base 110 is itself heated by conduction from the exhaust pipe 106. Thus, the water becomes heated and converted to steam. The transition tube 120 is a communication with the air inlet of the carburettor 102 and is thus under vacuum whilst the engine 100 is operating. Therefore, the steam is drawn into the transition tube 120 through the transition tube inlet. The steam passes through the transition tube 120 and in so doing is imparted with a spiral motion by the ribbon 128. This spiral motion urges the steam particles outwardly into the cells 126. The cells 126 project into the exhaust gas steam of the engine 100 and are thus the hottest part of the transition tube 120 particuarly at their outermost ends. The use of the ribbon 128 also has the advantage of urging the steam particles into contact with the hot surface of the transition tube 120. Without the ribbon 128 the steam particles would tend to expand away from the hot surface to the cooler centre of the bore and thus less efficient dissociation would take place.

Whilst in the cells 126 the steam is heated and dissociated into hydrogen and oxygen gases which proceed through the transition tube 120 into the carburettor 102.

Clearly, the ribbon 128 need only extend part way through the transition tube 120 particularly where it is within the exhaust pipe 106 and exhaust manifold 104 but should extend for a length sufficient to ensure efficient dissociation of the steam particles. Further, the whole system can be thermally insulated to avoid undue heat loss.

The ribbon 128 may be constructed of copper encapulated with high carbon steel to prevent the copper melting especially where the ribbon 128 contacts the transition tube 120. The copper core of the ribbon 128 transmits heat along the ribbon 128 and enables it to adopt a uniform temperature along its length. Also, the presence of the heated ribbon 128 assists in heating the centre of the transition tube 120 for more efficient dissociation.

The dissociation tube 120 may conveniently be formed of stainless steel and is preferably flexible to enable it to conform to the curvature of the exhaust of the engine 100.

Dissociation of the steam particles may be enhanced by including a sound projecting device in the air intake system of the carburettor 102. The sound projecting device faces the carburettor air intake throat. Such a system is illustrated schematically in FIGS. 6 and 7.

In FIGS. 6 and 7 there is shown the adaptor 124 of FIG. 5 and the adjacent end of the transition tube 120. In addition, there is shown a conventional air cleaner 130 which is connected to the adaptor 124 by an induction tube 132. The induction tube 132 has mounted about it a housing 134 containing a sound projector 136. The sound projector 136 is so mounted in the induction tube 132 as to allow air flow around it. Conveniently the sound projector 136 is energised by electric current drawn from the battery of the vehicle.

A resonator is formed of the carburettor throat, induction tube 132, cylinder induction space and transition tube 120. The gas mixture within the resonator is subject to the sound waves produced by the sound projector 136. This imparts energy to water molecules in the system and raises their level of excitation thus facilitating dissociation into hydrogen and oxygen.

At small throttle openings when the carburettor valve is almost closed, the sound is mostly diverted into the transition tube 120.

As the carburettor valve is opened more of the sound enters the cylinder induction spaces during the induction stroke. It should also be noted that the use of sound in the carburettor and cylinder induction spaces improves the atomisation of liquid fuel such as petrol, in air and thus leads to more efficient combustion of the liquid fuel.

I claim:

1. An internal combustion engine comprising inlet means, a combustion chamber and exhaust means, a dissociation chamber in heat communication with the exhaust means, inlet means for the dissociation chamber and outlet means for the dissociation chamber, means for introducing water to the dissociation chamber through the inlet means thereof, and means for introducing gases into the inlet means of the combustion chamber from the dissociation chamber from the outlet means thereof, wherein said dissociation chamber is in the form of a transition tube located at least in part within the exhaust means and said transition tube contains a spirally wound ribbon along at least part of its length located within the exhaust means, whereby in use, water in the transition tube is urged outwardly into contact with walls of the transition tube and hydrogen and oxygen so produced is introduced into the combustion chamber through the inlet means thereof.

2. An internal combustion engine according to claim 1, wherein walls of the transition tube within the exhaust means are internally and externally transversely ribbed so as to form transverse cells into which the water is urged.

3. An internal combustion engine according to claim 2, wherein the ribbon is a snug fit within the transition tube.

4. An internal combustion engine according to claim 1, wherein a housing is mounted to the exhaust means in heat conductive relation therewith and the means for introducing water to the dissociation chamber first introduces the water to the housing where the water is converted to steam prior to entering the dissociation chamber.

5. An internal combustion engine according to claim 1, wherein the inlet means of the combustion chamber includes an air intake means and the transition tube is in fluid communication with the air intake means.

6. An internal combustion engine according to claim 1, in which the transition tube is in fluid communication with the combustion chamber and the engine comprises a member which is arranged to induce sub-atmospheric pressure in the combustion chamber during operation of the engine.

7. An internal combustion engine according to claim 1, in which the exhaust means is in the form of a conduit and at least part of the transition tube is located within said conduit.

8. An internal combustion engine according to claim 1, which comprises a conventional carburettor having a main jet and a pilot jet, means being provided to selectively block the main jet and the means for introducing the dissociation products to the inlet means of the combustion chamber to enable the combustion chamber to selectively receive liquid fuel from the main jet but also to receive gas from the transition tube.

9. An internal combustion engine according to claim 1, which further comprises a sound projector arranged to subject gas mixtures within the engine to sound waves to raise the excitation levels of water molecules therein and facilitate dissociation thereof.

10. An exhaust means for an internal combustion engine having a dissociation chamber in heat communication therewith, said dissociation chamber having water inlet means and gas outlet means, means for coupling the gas outlet means to an inlet means of an internal combustion engine and means for coupling the water inlet means to a supply of water, wherein the dissociation chamber is in the form of a transition tube located at least in part within the exhaust means and said transition tube contains a spirally wound ribbon along at least part of its length located within the exhaust means, whereby, in use, water in the transition tube is urged outwardly into contact with walls of the transition tube.

* * * * *